United States Patent
Rowe, Jr. et al.

(10) Patent No.: US 12,196,258 B2
(45) Date of Patent: Jan. 14, 2025

(54) SPHERICAL PLAIN BEARING WITH ANGULAR MISALIGNMENT RESTRAINT SYSTEM, AND ANGULAR MISALIGNMENT RESTRAIN SYSTEM

(71) Applicant: Roller Bearing Company of America, Inc., Oxford, CT (US)

(72) Inventors: Brian Rowe, Jr., New Milford, CT (US); James Voisine, Burlington, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 74 days.

(21) Appl. No.: 17/983,590

(22) Filed: Nov. 9, 2022

(65) Prior Publication Data

US 2023/0151850 A1    May 18, 2023

Related U.S. Application Data

(60) Provisional application No. 63/278,926, filed on Nov. 12, 2021.

(51) Int. Cl.
| | |
|---|---|
| *F16C 23/04* | (2006.01) |
| *F16C 33/74* | (2006.01) |
| *F16C 11/06* | (2006.01) |

(52) U.S. Cl.
CPC ............ *F16C 23/043* (2013.01); *F16C 33/74* (2013.01); *F16C 11/0614* (2013.01); *F16C 11/0676* (2013.01); *F16C 23/046* (2013.01)

(58) Field of Classification Search
CPC .............. F16C 11/0614; F16C 11/0628; F16C 11/0633; F16C 11/0666; F16C 11/0676;
(Continued)

(56) References Cited

U.S. PATENT DOCUMENTS

| | | |
|---|---|---|
| 2,984,995 A | 5/1961 | Kalen |
| 2,995,813 A | 8/1961 | Board, Jr. |

(Continued)

FOREIGN PATENT DOCUMENTS

| | | | |
|---|---|---|---|
| DE | 102016203741 B3 | * | 4/2017 |
| WO | 2020223759 A1 | | 11/2020 |

OTHER PUBLICATIONS

Translation of DE102016203741 obtained Apr. 17, 2024.*

*Primary Examiner* — James Pilkington
(74) *Attorney, Agent, or Firm* — Ruggiero McAllister & McMahon LLC

(57) ABSTRACT

A spherical plain bearing includes an outer ring having a concave interior spherical surface, and an inner member having a convex exterior spherical surface. The inner member is pivotally disposed in the outer ring such that the inner member and the outer ring are angularly misalignable relative to one another. The spherical plain bearing includes an angular misalignment restraint system which includes an inner member restraint feature on the inner member and an outer ring restraint feature on the outer member. The first and second portions are spaced apart when the inner member and the outer ring are angularly misaligned relative to one another by less than a predetermined maximum angle θ, and come into abutment when the inner member and the outer ring are angularly misaligned relative to one another by angle θ. The abutment prevents any further relative angular misalignment of the inner member and the outer ring.

13 Claims, 11 Drawing Sheets

(58) Field of Classification Search
CPC ...... F16C 11/069; F16C 17/105; F16C 23/04; F16C 23/043; F16C 23/045; F16C 23/046
See application file for complete search history.

(56) References Cited

U.S. PATENT DOCUMENTS

| | | | |
|---|---|---|---|
| 3,501,180 | A | 3/1970 | Waara |
| 3,510,178 | A | 5/1970 | Sowatzke |
| 3,790,195 | A | 2/1974 | Herbenar |
| 4,055,369 | A | 10/1977 | Lynn et al. |
| 4,095,856 | A | 6/1978 | Markovitz |
| 4,355,250 | A | 10/1982 | Langdon |
| 4,464,141 | A | 8/1984 | Brown |
| 4,844,627 | A * | 7/1989 | Speakman ............ F16C 23/045 384/208 |
| 5,902,050 | A | 5/1999 | Balczun et al. |
| 7,675,211 | B2 | 3/2010 | Dimascio et al. |
| 10,107,314 | B2 | 10/2018 | Cooper et al. |
| 10,288,173 | B2 | 5/2019 | Chapagain et al. |
| 10,527,218 | B2 | 1/2020 | Shannahan et al. |
| 11,009,063 | B2 | 5/2021 | McGuire et al. |
| 11,319,165 | B2 | 5/2022 | Friedrich et al. |
| 11,391,323 | B2 | 7/2022 | McGuire et al. |
| 2006/0222277 | A1* | 10/2006 | Smith ................... F16C 23/045 384/192 |
| 2008/0181719 | A1 | 7/2008 | Gleason et al. |
| 2015/0226256 | A1* | 8/2015 | Voisine ............... F16C 11/0614 384/147 |
| 2019/0093710 | A1 | 3/2019 | Parker |
| 2019/0101154 | A1 | 4/2019 | Gagne et al. |
| 2020/0072277 | A1 | 3/2020 | Wilhelm et al. |
| 2022/0136560 | A1 | 5/2022 | Voisine et al. |

\* cited by examiner

SPHERICAL PLAIN BEARING WITH ANGULAR MISALIGNMENT RESTRAINT SYSTEM, AND ANGULAR MISALIGNMENT RESTRAIN SYSTEM

CROSS-REFERENCE TO RELATED APPLICATION

This application is a non-provisional application of, and claims priority to U.S. Provisional Patent Application No. 63/278,926, entitled "Spherical Plain Bearing with Angular Misalignment Limiter," filed on Nov. 12, 2021, the entire contents of which are incorporated herein by reference in their entirety.

TECHNICAL FIELD

The present disclosure relates generally to spherical plain bearings, and more particularly to a spherical plain bearing with an angular misalignment restrain system configured to prevent damage to the bearing during maximum misalignment orientations. The present disclosure further relates to an angular misalignment restrain system for a spherical plain bearing.

BACKGROUND

Spherical plain bearings generally include inner and outer ring members wherein the outer ring member has a spherical concave interior surface that defines a cavity therein and wherein the inner member is disposed in the cavity and has a spherical convex surface that is complementary to, and is dimensioned to match, the concave interior surface of the outer ring member. In the assembled bearings, the concave and convex surfaces slide over each other to define the bearing surfaces or load zone. The bearings could have metal-to-metal contact of the concave interior surface with the convex surface with a lubricant (e.g., grease) disposed therebetween. Some spherical bearings employ a self-lubricating liner (e.g., a polytetrafluoroethylene liner) disposed between the concave interior surface and the convex surface.

Spherical plain bearings permit angular oscillation about a central point in two orthogonal directions (usually within a specified angular limit based on the bearing geometry). Typically, these bearings support a shaft that is rotatable in the bore of the inner ring that must move not only rotationally, but also at an angle that is referred to as angular misalignment. Some prior art spherical plain bearings tend to expose the concave and convex surfaces at maximum misalignment angles which can result in the ingress of contaminants into the bearing. The maximum misalignment can also damage the inner and outer member.

Thus, there is a need for an improved spherical plain bearing that overcomes the foregoing problems.

SUMMARY

According to aspects illustrated herein, a spherical plain bearing includes an outer ring that has an outer ring first axial end, an outer ring second axial end opposite to the outer ring first axial end, and a concave interior spherical surface that extends between the outer ring first axial end and the outer ring second axial end. The spherical plain bearing includes an inner member that has an inner member first axial end, an inner member second axial end opposite to the inner member first axial end and a convex exterior spherical surface between the inner member first axial end and the inner member second axial end. The inner member is pivotally disposed at least partially in the outer ring such that the inner member and the outer ring are angularly misalignable relative to one another. The spherical plain bearing includes an angular misalignment restraint (e.g., limiter) system that is configured in the outer ring and the inner member.

In some embodiments, the angular misalignment restraint system includes an inner member restraint feature on the inner member and an outer ring restraint feature on the outer member.

In some embodiments, a first portion of the inner member restrain feature is spaced apart from a second portion of the outer ring restraint feature when the inner member and the outer ring are angularly misaligned relative to one another by less than a predetermined maximum angle θ, and the first portion of the inner member restrain feature is shaped and arranged to come into abutment with the second portion of the outer ring restraint feature when the inner member and the outer ring are angularly misaligned relative to one another by the predetermined maximum angle θ. The abutment prevents any further angular misalignment of the inner member relative to the outer ring.

In some embodiments, the inner member restraint feature includes a radially outward extending lip formed on the first axial inner member end. The lip transitions into a concave arcuate valley which blends into the convex exterior surface of the inner member. The first portion includes the concave arcuate valley, which in some embodiments has a depth of 0.010 to 0.150 inches (i.e., 0.254 mm to 3.81 mm) and a width of 0.020 to 0.300 inches (i.e., 0.508 mm to 7.62 mm).

In some embodiments, the outer ring includes a radially outward extending first circumferential groove that is located proximate the outer ring first axial end and extends radially out into a first cylindrical shoulder. The outer ring restraint feature includes an annular bumper pad that has an anchor leg secured in the first circumferential groove and a head portion that extends from the anchor leg and circumferentially around the bumper pad. The second portion includes the head portion.

In some embodiments, the head portion has a convex arcuate surface that is complementary in shape to the concave arcuate valley. The convex arcuate surface has a first radius of curvature and the concave arcuate valley has a second radius of curvature. The second radius of curvature is about 100 to 120 percent of the first radius of curvature. Preferably, the second radius of curvature is about 102 percent of the first radius of curvature.

In some embodiments, a self-lubricating liner is disposed between the concave interior spherical surface and the convex exterior spherical surface.

In some embodiments, the outer ring has one or more splits that extend axially from the first axial outer ring end to the second axial outer ring end and radially through the outer ring.

In some embodiments, the outer ring includes a radially outward extending second circumferential groove that is located proximate the second axial outer ring end and an annular seal seated in the second circumferential groove. A portion of the seal sealingly and slidingly engages the convex exterior spherical surface.

In some embodiments, the outer ring includes a radially outward extending second circumferential groove located proximate the outer ring second axial end and extending radially out into a second cylindrical shoulder. A second outer ring restraint feature (i.e., an annular bumper pad that has an anchor leg secured in the second circumferential groove and a head portion extending from the anchor leg and extending circumferentially around the bumper pad).

In some embodiments, the outer member restraint feature is configured in an interference fit with the convex exterior spherical bearing surface of the inner member to function as a seal.

In some embodiments, the inner member restrain feature is an arcuate surface or a chamfer.

In some embodiments, the angular misalignment restraint system is a first angular misalignment restraint system, and the spherical plain bearing comprises a second angular misalignment restraint system including a second inner member restraint feature on the inner member and a second outer ring restraint feature on the outer member. The first angular misalignment restrain system is on the outer ring first axial end and the inner member first axial end, and the second angular misalignment restrain system is on the outer ring second axial end and the inner member second axial end. A first portion of the second inner member restrain feature is spaced apart from a second portion of the second outer ring restraint feature when the inner member and the outer ring are angularly misaligned relative to one another by less than the predetermined maximum angle θ. The first portion of the second inner member restrain feature is shaped and arranged to come into a second abutment with the second portion of the second outer ring restraint feature when the inner member and the outer ring are angularly misaligned relative to one another by the predetermined maximum angle θ. The second abutment prevents any further angular misalignment of the inner member relative to the outer ring.

According to aspects illustrated herein, an angular misalignment restraint system for a spherical plain bearing includes an inner member restraint feature on the inner member of the spherical plain bearing, and an outer ring restraint feature on the outer member of the spherical plain bearing. A first portion of the inner member restrain feature is spaced apart from a second portion of the outer ring restraint feature when the inner member and the outer ring are angularly misaligned relative to one another by less than a predetermined maximum angle θ. The first portion of the inner member restrain feature is shaped and arranged to come into abutment with the second portion of the outer ring restraint feature when the inner member and the outer ring are angularly misaligned relative to one another by the predetermined maximum angle θ. The abutment prevents any further angular misalignment of the inner member relative to the outer ring.

Any of the foregoing embodiments may be combined.

BRIEF DESCRIPTION OF THE DRAWING

Referring now to the Figures, which are exemplary embodiments, and wherein the like elements are numbered alike.

DETAILED DESCRIPTION

Figure 1:
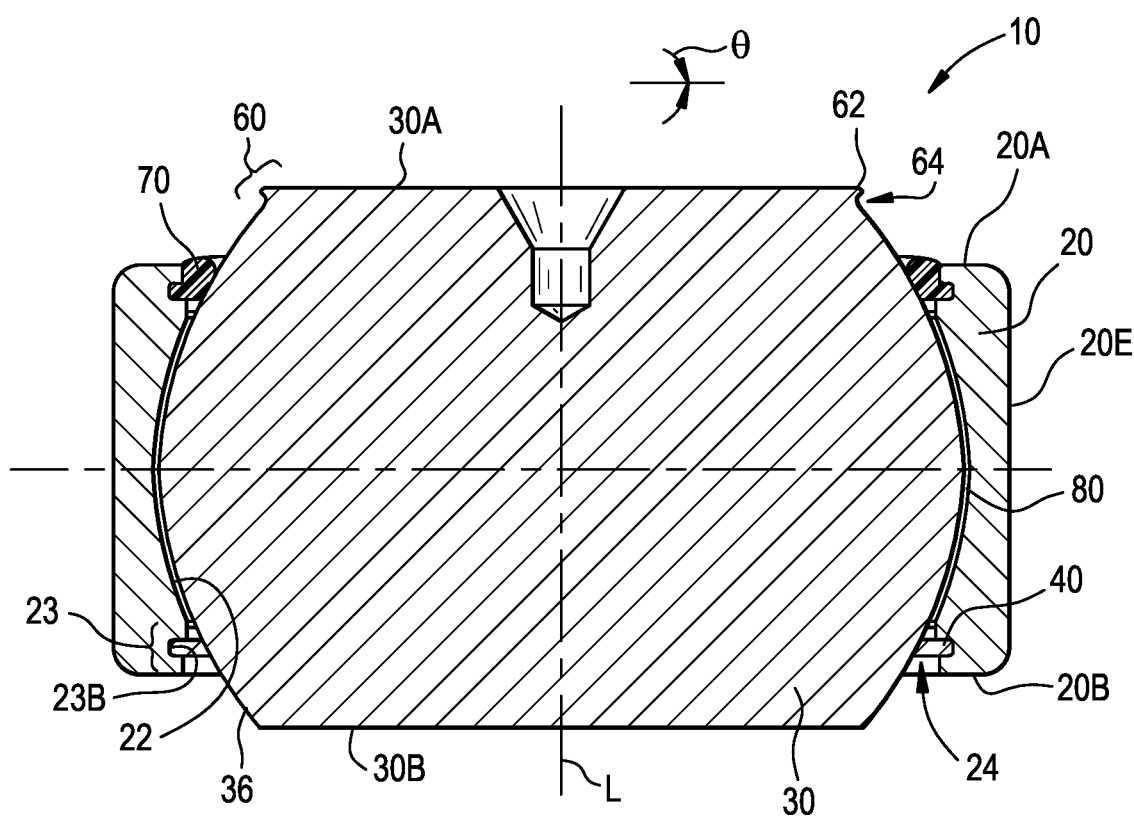
FIG. 1 is cross-sectional view of an exemplary spherical bearing of the present disclosure shown in a zero-angle misalignment state.
Figure 2A:
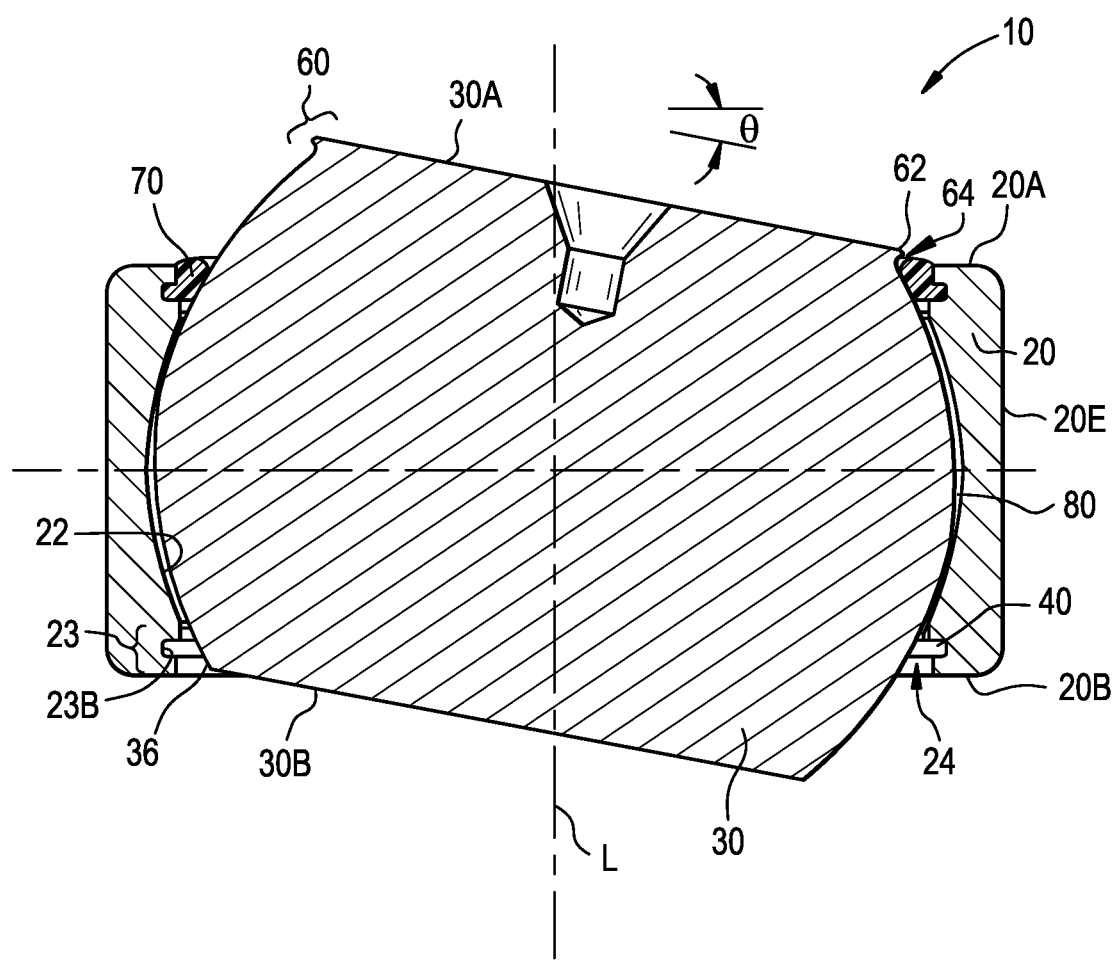
FIG. 2A is a cross-sectional view of the spherical bearing of FIG. 1 in a state of maximum misalignment.
Figure 2B:
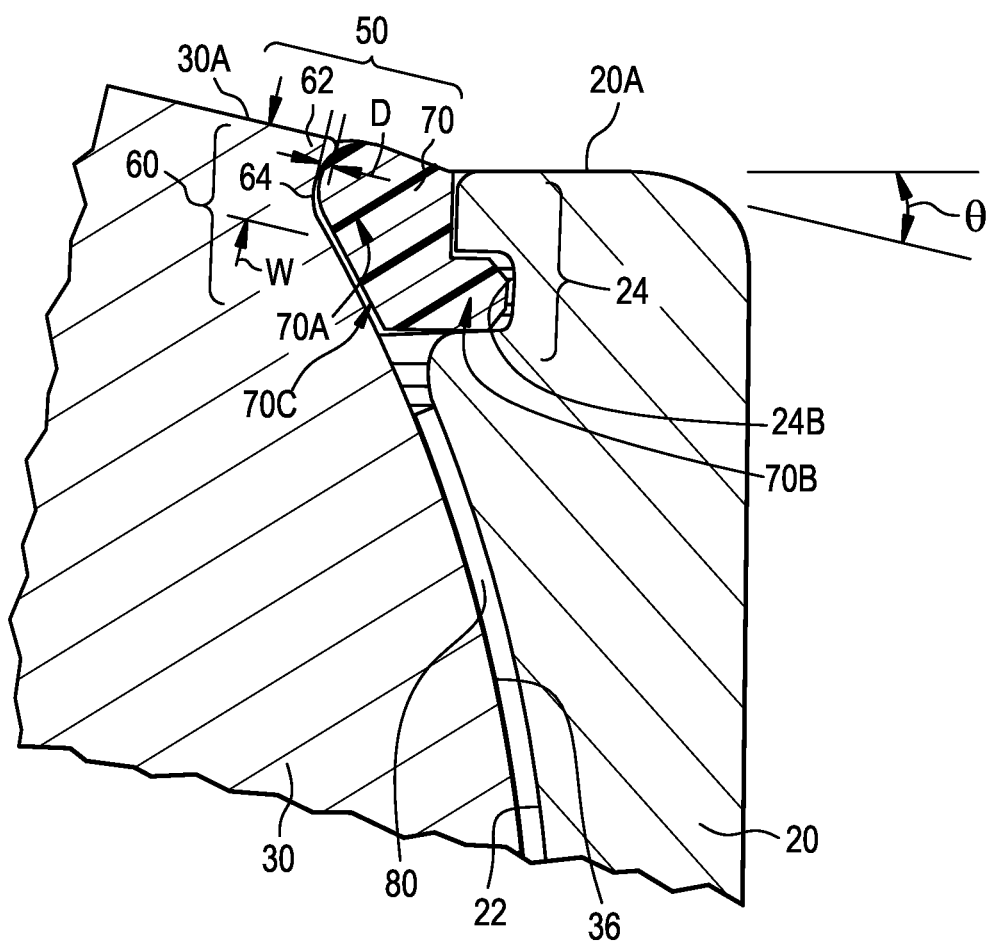
FIG. 2B is an enlarged cross-sectional view of a portion of the spherical bearing of FIG. 2A.

As shown in FIG. 1, a spherical plain bearing is generally designated by the number 10. The bearing 10 includes an outer ring 20 and an inner member 30 disposed partially in the outer ring 20. The inner member 30 and the outer ring 20 are angularly misalignable relative to one another as shown in FIGS. 2A and 2B. The bearing 10 is shown in FIG. 1 in a zero-angle misalignment state wherein both the inner member 30 and the outer ring 20 are coaxial with the longitudinal axis L.

The outer ring 20 has an outer ring first axial end 20A and an outer ring second axial end 20B opposite to the outer ring first axial end 20A. The outer ring 20 has a concave interior spherical bearing surface 22 and an outer bearing surface 20E between the outer ring first axial end 20A and the outer ring second axial end 20B. The concave interior spherical bearing surface 22 defines an opening 24.

As shown in FIG. 1, the inner member 30 is a solid truncated spherical ball that has an inner member first axial end 30A and an inner member second axial end 30B opposite to the inner member first axial end 30A. While the inner member 30 is shown in FIG. 1 as being a solid truncated spherical ball, the present disclosure is not limited in this regard as other configurations are included in the present disclosure including but not limited to the spherical bearing shown in FIGS. 5A and 5B.

Figure 5A:
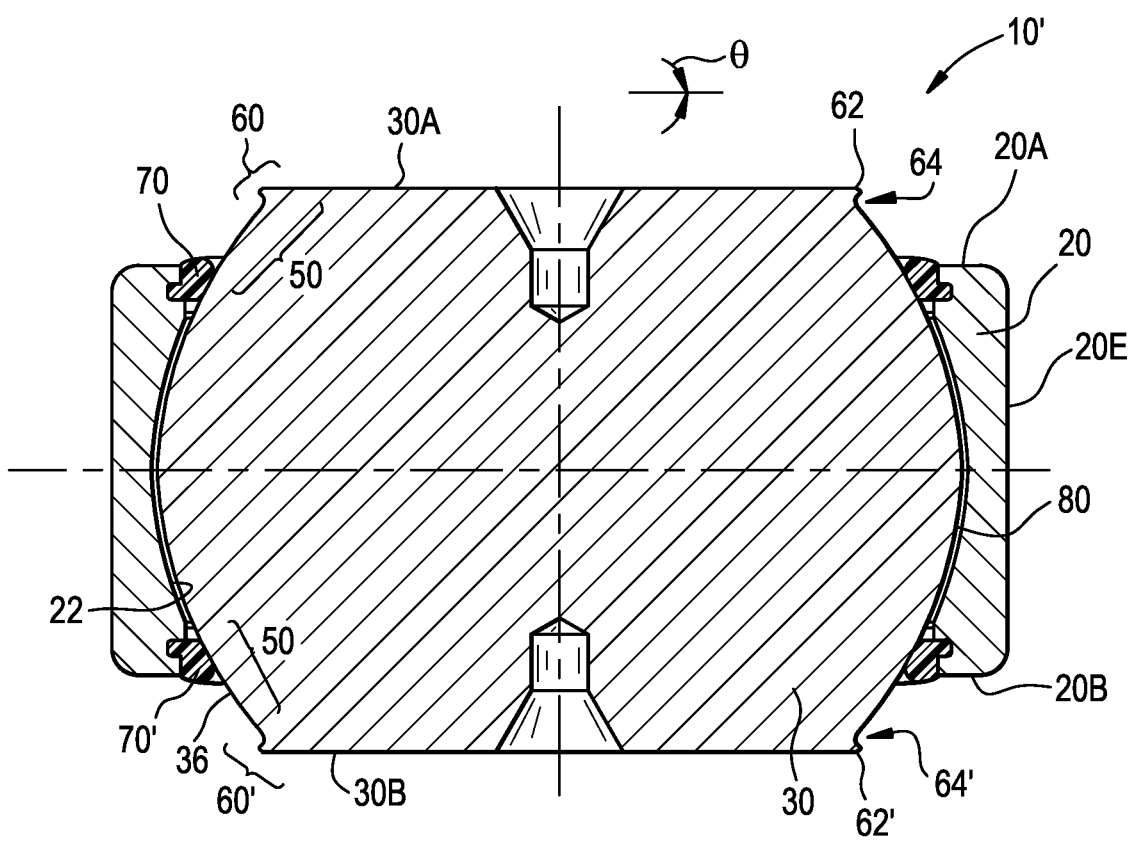
FIG. 5A is a cross-sectional view of another exemplary embodiment of a spherical bearing in a zero-angle misalignment state.

As shown in FIGS. 1 and 5A, the outer ring first axial end 20A and the inner member first axial end 30A are parallel to one another when the outer ring 20 and the inner member 30 are positioned coaxially with a longitudinal axis L with no angular misalignment. The inner member 30 has a convex exterior spherical bearing surface 36 that is located between the inner member first axial end 30A and the inner member second axial end 30B. As shown in FIG. 1, the convex exterior spherical bearing surface 36 of the inner member 30 substantially conforms in shape to the concave interior spherical bearing surface 22 of the outer ring 20, and the inner member 30 is received in the opening 24 of the outer ring 20. The convex exterior spherical bearing surface 36 is complementary in shape to the concave interior spherical bearing surface 22. The bearing 10 has an angular misalignment restraint (e.g., limiter) system 50 (see FIG. 2B) on the outer ring 20 and the inner member 30 as described herein. The angular misalignment restraint system 50 has utility in preventing damage due to excessive misalignment in bearings utilized in various systems including but not limited to bearings and linkages in vehicle suspension systems.

As shown in FIG. 2B, the angular misalignment restraint system 50 includes an inner member restraint feature 60 on the inner member 30 proximate the inner member first axial end 30A and an outer ring restraint feature 70 on the outer member 20 proximate the outer ring first axial end 20A. The inner member restraint feature 60 includes a radially outward extending lip 62 formed on the inner member first axial end 30A. The axial lip 62 is an arcuate surface that has a radius of curvature R3 (see FIG. 4A) transitions into a concave arcuate valley 64 which blends into the convex exterior surface 36 of the inner member 30. In some embodiments, the concave arcuate valley 64 has a depth D of 0.010 to 0.150 inches (i.e., 0.254 mm to 3.81 mm) and a width W of 0.020 to 0.300 inches (i.e., 0.508 mm to 7.62 mm), depending on the bearing size. While the lip 62 is shown in FIG. 4A as having a radius of curvature R3, the present disclosure is not limited in this regard as other configurations are included in the present disclosure such as but not limited to the lip 63 having a chamfer (i.e., flat) configuration as shown in FIG. 4B.

As shown in FIG. 2B, the outer ring 20 has a radially outward extending circumferential groove 24B located proximate the outer ring first axial end 20A and in a cylindrical shoulder 23 that extends axially inward from the outer ring first axial end 20A. The outer ring restraint feature 70 includes an annular bumper pad 70 that has an anchor leg 70B secured in the groove 24B and a head portion 70A extending from the anchor leg 70B and extending circumferentially around the bumper pad 70. The head portion 70A has a convex arcuate surface that is complementary in shape to the concave arcuate valley 64.

In some embodiments, a mid-portion 70C of the annular bumper pad 70 has a shape that is complementary (e.g., concave spherical) to the exterior surface 36 of the inner member 30, and is configured to slide on the exterior surface 36 during misalignment movement. However, in other embodiments, the mid-portion 70C of the annular bumper pad 70 does not have a shape that is complementary to the exterior surface 36 of the inner member 30, and does not slide on the exterior surface 36 during misalignment movement. The mid-portion 70C can operate as an anti-rotation feature that assists in preventing the anchor leg 70B of the bumper pad 70 from dislodging from the groove 24B during mis-alignment movement.

Figure 4A:
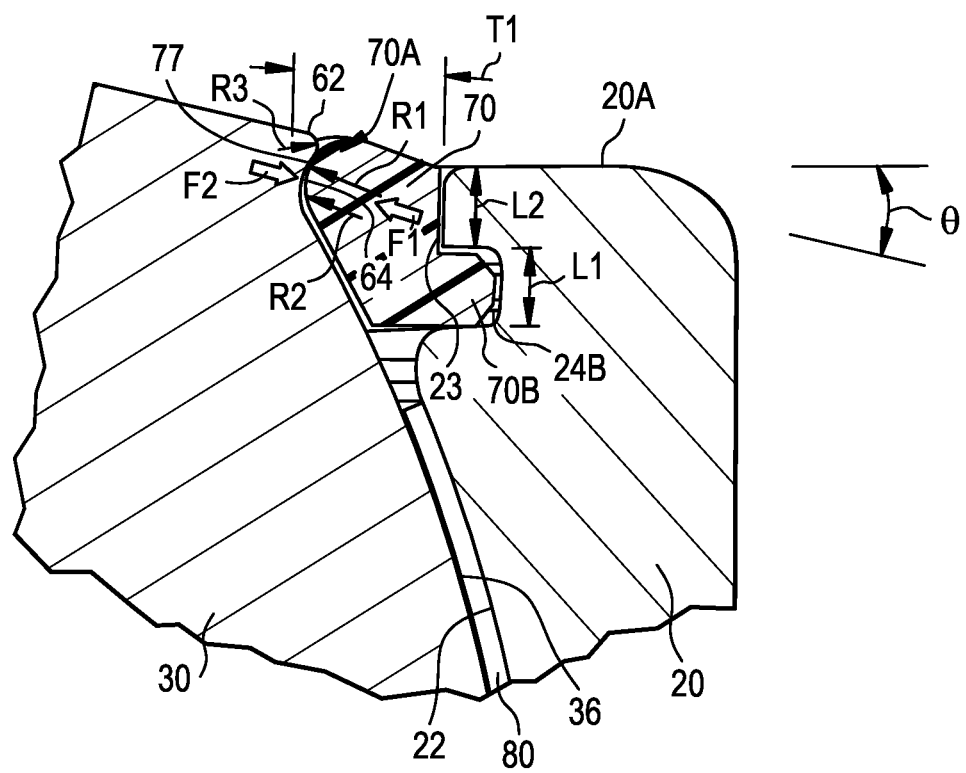
FIG. 4A is another enlarged cross-sectional view of a portion the spherical bearing of FIG. 2A.
Figure 4B:
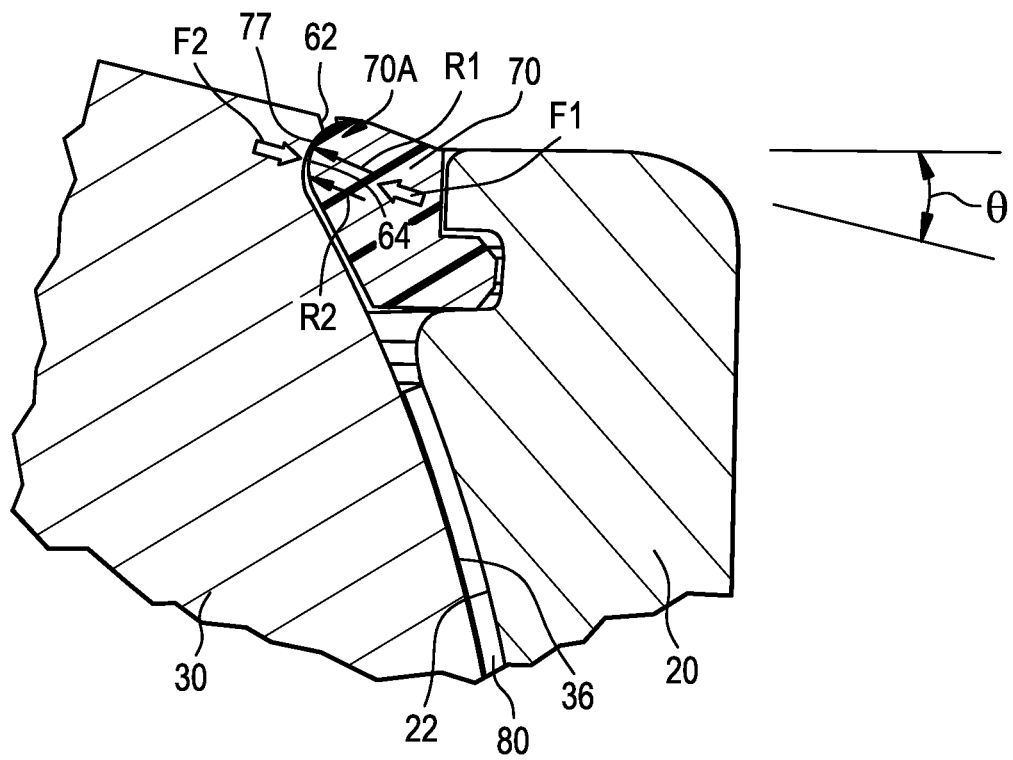
FIG. 4B is a cross-sectional view of a portion of another exemplary embodiment of the spherical bearing in a state of maximum misalignment.

As shown in FIG. 4A, the radially outward extending circumferential groove 24B has a width L1 of about 0.025 inches to about 0.250 inches (i.e., 0.635 mm to 6.35 mm). The radially outward extending circumferential groove 24B is located a distance L2 of about 0.025 inches to about 0.250 inches (i.e., 0.635 mm to 6.35 mm) measured axially inward from the outer ring first axial end 20A. The head portion 70A has length Tl of about 0.050 inches to about 0.500 inches (i.e., 1.27 mm to 12.7 mm) measured radially inward from the cylindrical shoulder 23.

As shown in FIGS. 2A and 2B, the inner member 30 and the outer ring 20 are angularly misaligned relative to one another by a predetermined maximum angle θ. The head portion 70A of the outer ring restraint feature 70 engages the concave arcuate valley 64 of the inner member restraint feature 60, to prevent any further angular misalignment of the inner member 30 relative to the outer ring 20. As shown in FIG. 4A, at a maximum angle of misalignment θ the head portion 70A of the outer ring restraint feature 70 imparts a force F1 on the lip 62 and the concave arcuate valley 64 which counteracts the force F1 with a reaction force F2.

FIG. 1 shows that the concave arcuate valley 64 of the inner member restraint feature 60 and the head portion 70A of the outer ring restraint feature 70 are spaced apart when the inner member 30 and the outer ring 20 are angularly misaligned relative to one another by less than a predetermined maximum angle θ (e.g., the angle θ shown in FIG. 1 is zero). By contrast, FIGS. 2A and 2B show that the concave arcuate valley 64 of the inner member restraint feature 60 is shaped and arranged to come into abutment with the head portion 70A of the outer ring restraint feature 70 when the inner member 30 and the outer ring 20 are angularly misaligned relative to one another by the predetermined maximum angle θ. This abutment prevents any further angular misalignment of the inner member 30 relative to the outer ring 20.

As shown in FIGS. 2A and 2B, a self-lubricating liner 80 is disposed between the concave interior spherical surface 22 and the convex exterior spherical surface 36. In some embodiments, the self-lubricating liner 80 is secured (e.g., adhered) to the concave interior spherical surface 22. The self-lubricating liner 80 is a woven fabric that includes polytetrafluoroethylene (PTFE) or molded PTFE material.

Figure 3A:
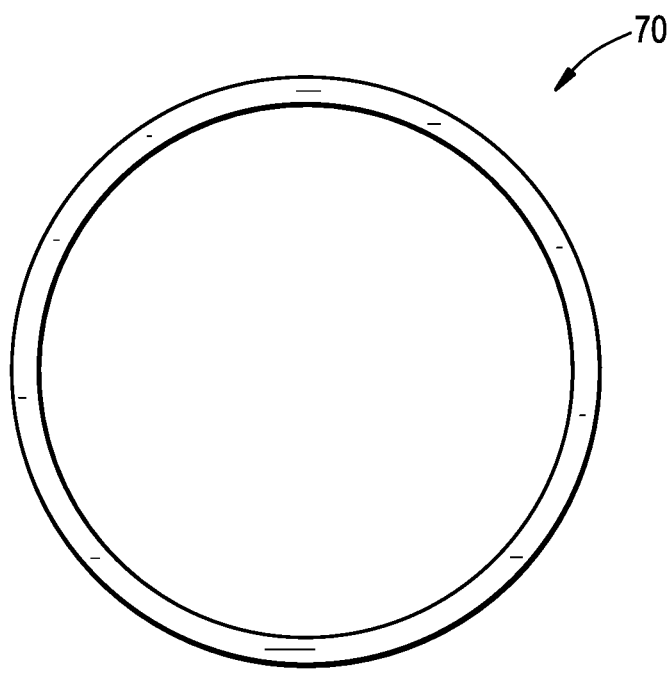
FIG. 3A is an end view of the outer ring restraint feature of the spherical bearing of FIG. 1.

The annular bumper pad 70, shown for example in FIG. 3A, is made from a tough plastic material with high abrasion and wear resistance such as an ultra-high molecular weight (UHMW) polyethylene material. While the bumper pad 70 is described as being made from UHMW polyethylene material, the present disclosure is not limited in this regard as other materials for the bumper pad 70 are included in the present disclosure such as but not limited to brass, bronze, thermoplastics (delrin, acetal, teflon, polyester), elastomers (polyurethane, nitrile, silicone) and thermoplastic elastomers inventors please provide other options for materials.

As shown in FIG. 4A, the head portion 70A has a convex arcuate surface 77 that is substantially complementary in shape to the concave arcuate valley 64. The convex arcuate surface 77 has a first radius of curvature R1 and the concave arcuate valley 64 has a second radius of curvature R2. In some embodiments, the second radius of curvature R2 is about 100 to 120 percent of the first radius of curvature R1. In some embodiments, the second radius of curvature R2 is about 102 percent of the first radius of curvature R1.

Figure 3B:
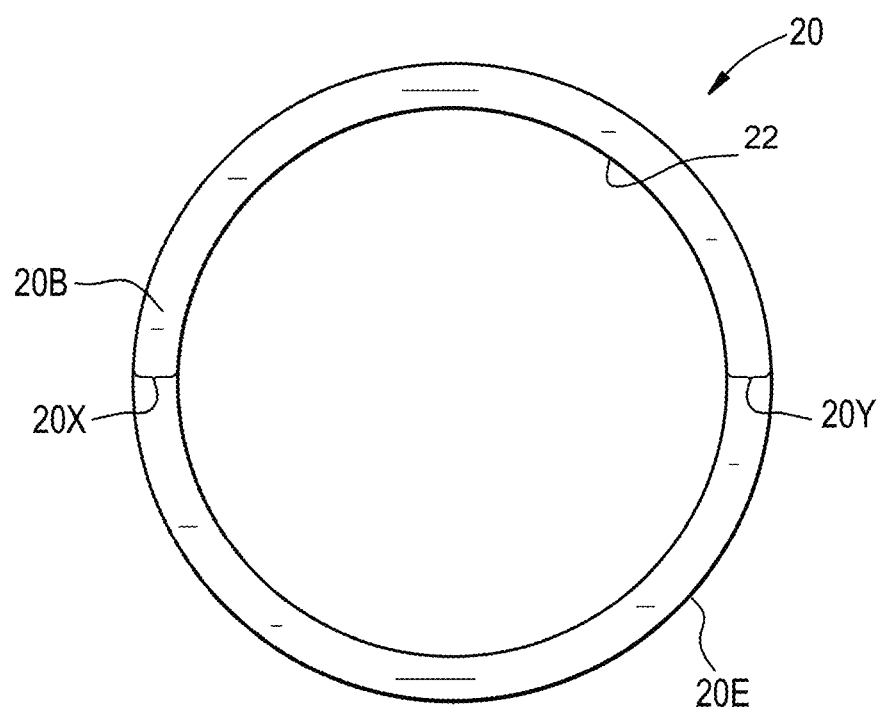
FIG. 3B is an end view of the outer ring of the spherical bearing of FIG. 1.

As shown in FIG. 3B, the outer ring 20 has two fracture splits 20X and 20Y that extend axially from the outer ring first axial end 20A to the outer ring second axial end 20B and radially through the outer ring 20. The two fracture splits 20X and 20Y facilitate assembly of the outer ring 20 and bumper pad 70 over the inner member 30. While two axial splits are shown and described, the present disclosure is not limited in this regard as the outer ring 20 may employ only one fracture split or more than two fracture splits.

As shown in FIG. 1, the outer ring 20 has a radially outward extending second circumferential groove 23B located proximate the second axial outer ring end 20B outward into and circumferentially along a cylindrical shoulder 23 that extends axially inward from the second axial outer ring end 20B. An annular seal 40 is disposed in the seal groove 23B. An annular seal 40 is seated in second circumferential groove 23B. A portion of the seal 40 sealingly and slidingly engages the convex exterior spherical surface 36.

The inner member 30 is manufactured from a metallic material such as a SAE-AISI 52100 steel, SAE-AISI 8620 steel, stainless steel or bronze. The outer ring 20 is manufactured from a metallic material such as SAE-AISI 52100 steel, SAE-AISI 8620 steel and stainless steel. In some embodiments, the inner member 30 and/or the outer ring 20 are coated with a suitable protective coating such as, but not limited to a zinc, a black oxide and a chromium coating.

Figure 5B:
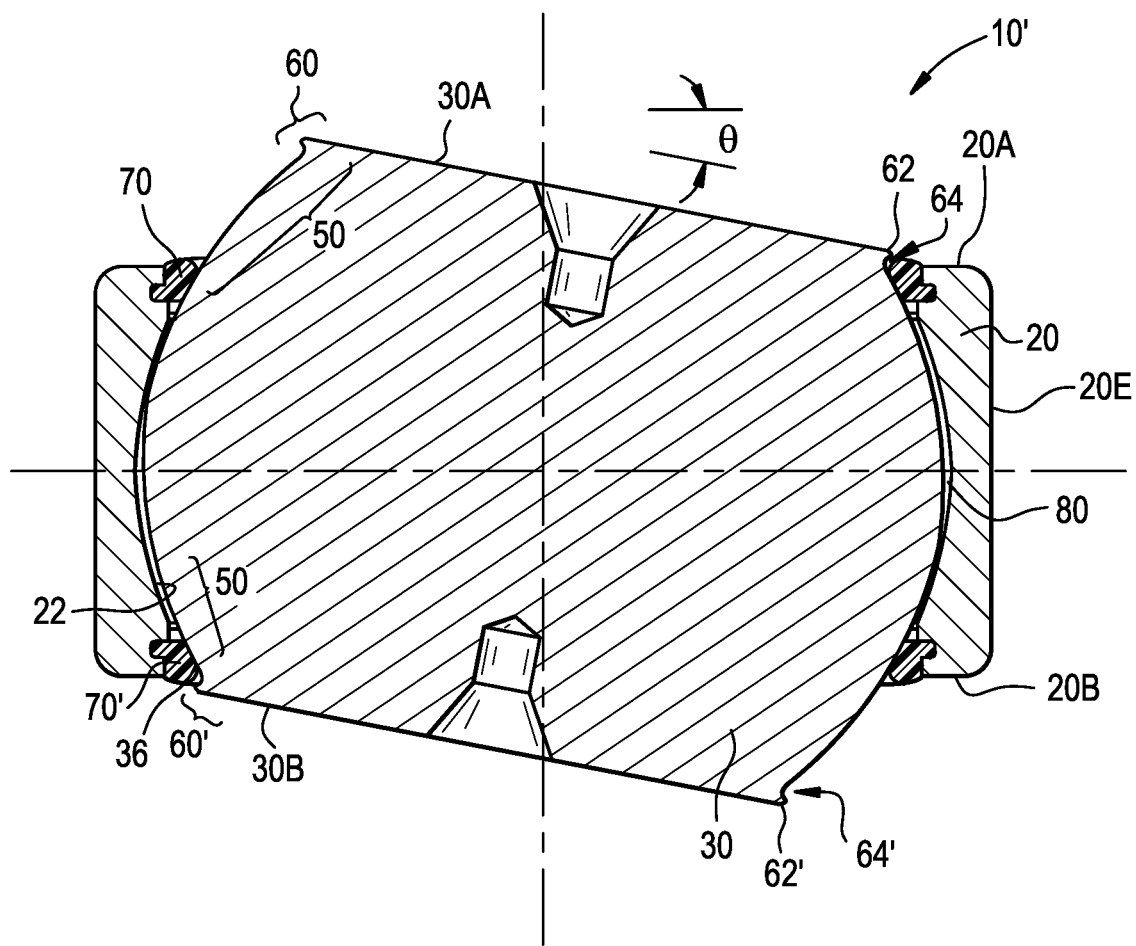
FIG. 5B is a cross-sectional view of the spherical bearing of FIG. 5A in a state of maximum misalignment.

The spherical bearing 10' of FIGS. 5A and 5B is similar to the spherical bearing 10 of FIG. 1 with the exception that the spherical bearing 10' includes another inner member restraint feature 60' (i.e., axial lip 62' which transitions into a concave arcuate valley 64') on the inner member 30 proximate the inner member second axial end 30B and another outer ring restraint feature 70' on the outer member 20 proximate the outer ring second axial end 20B, in addition to the inner member restraint feature 60 on the inner member 30 proximate the inner member first axial end 30A and outer ring restraint feature 70 on the outer member 20 proximate the outer ring first axial end 20A. In the embodiment shown in FIGS. 5A and 5B the spherical bearing 10' has no seal similar to the seal 40 shown in FIG. 1, however in some embodiments the spherical bearing 10' includes a seal seated in a circumferential groove similar to the seal 40 and circumferential groove 23B shown in FIG. 1. In some embodiments, the outer ring restraint feature 70 (i.e., bumper pad) and/or the outer ring restraint feature 70' are configured in an interference fit with the exterior surface 36 of the inner member 30 to function as a seal.

FIG. 5A shows that the concave arcuate valley 64' of the inner member restraint feature 60' and a head portion of the outer ring restraint feature 70 are spaced apart when the inner member 30 and the outer ring 20 are angularly misaligned relative to one another by less than the predetermined maximum angle θ (the angle being zero, as illustrated). By contrast, FIG. 5B shows that the concave arcuate valley 64' of the inner member restraint feature 60' is shaped and arranged to come into abutment with the head portion of the outer ring restraint feature 70' when the inner member 30 and the outer ring 20 are angularly misaligned relative to one another by the predetermined maximum angle θ. This abutment prevents any further angular misalignment of the inner member 30 relative to the outer ring 20.

Figure 6:
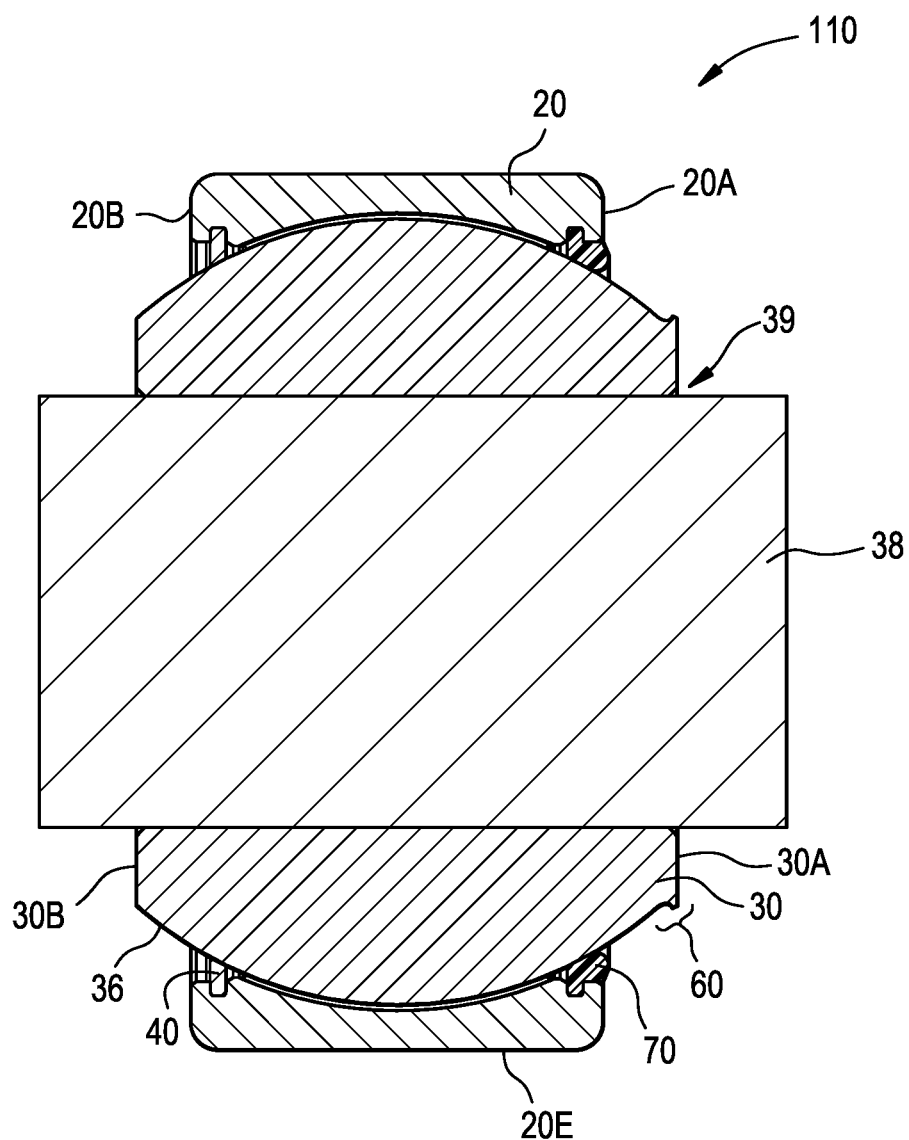
FIG. 6 is a cross-sectional view of another exemplary embodiment of the spherical bearing of the present disclosure shown in a zero-angle misalignment state and having a pin extending therethrough.

The spherical bearing 110 shown in FIG. 6 is similar to the spherical bearing 10 of FIG. 1, except that the inner member 30 has a bore 39 extending therethrough and a pin 38 extending through the bore 39.

Figure 7:
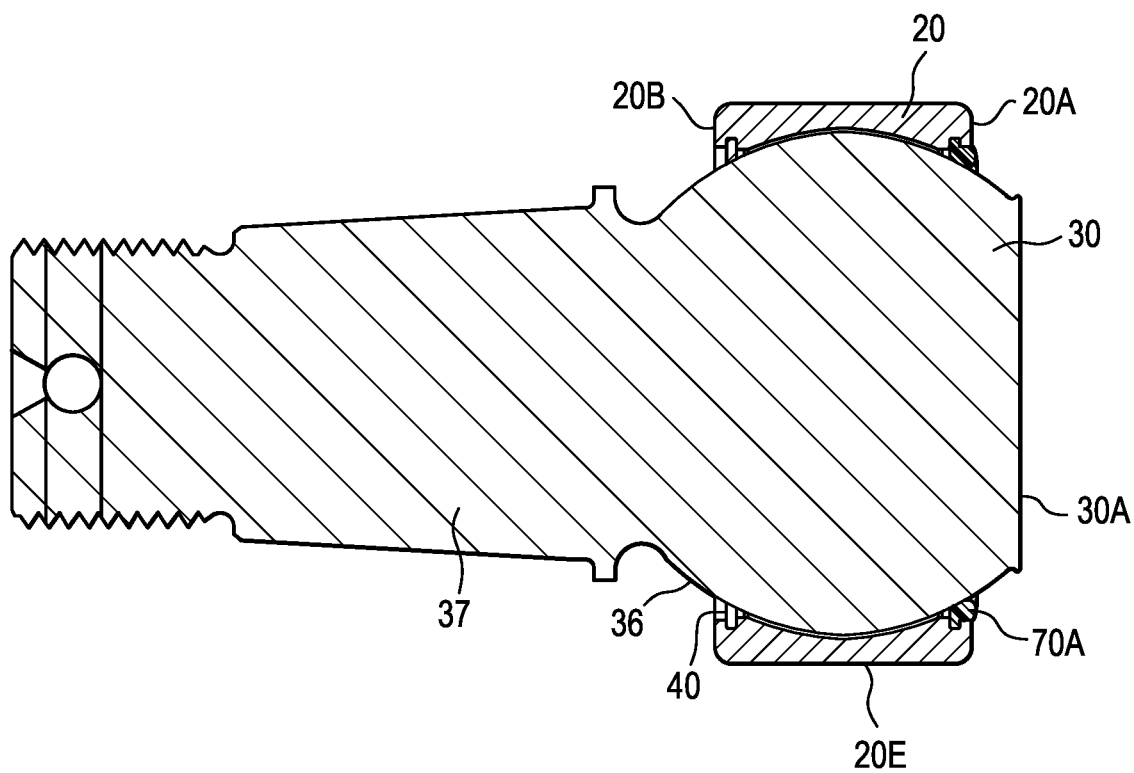
FIG. 7 is a cross-sectional view of another exemplary embodiment of the spherical bearing of the present disclosure shown in a zero-angle misalignment state and having a ball stud extending therethrough.

The spherical bearing 210 shown in FIG. 7 is similar to the spherical bearing 10 of FIG. 1, except that the inner member 30 has a stud 37 extending axially therefrom.

While the present disclosure has been described with reference to various exemplary embodiments, it will be understood by those skilled in the art that various changes may be made, and equivalents may be substituted for elements thereof without departing from the scope of the invention. In addition, many modifications may be made to adapt a particular situation or material to the teachings of the disclosure without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A spherical plain bearing comprising:
   an outer ring having an outer ring first axial end, an outer ring second axial end opposite to the outer ring first axial end, and a concave interior spherical surface extending between the outer ring first axial end and the outer ring second axial end;
   an inner member having an inner member first axial end, an inner member second axial end opposite to the inner member first axial end and a convex exterior spherical surface between the inner member first axial end and the inner member second axial end, the inner member being pivotally disposed at least partially in the outer ring such that the inner member and the outer ring are angularly misalignable relative to one another; and
   an angular misalignment restraint system which includes an inner member restraint feature on the inner member and an outer ring restraint feature on the outer member,
   wherein a first portion of the inner member restrain feature is spaced apart from a second portion of the outer ring restraint feature when the inner member and the outer ring are angularly misaligned relative to one another by less than a predetermined maximum angle θ,
   wherein the first portion of the inner member restrain feature is shaped and arranged to come into abutment with the second portion of the outer ring restraint feature when the inner member and the outer ring are angularly misaligned relative to one another by the predetermined maximum angle θ, and
   wherein the abutment prevents any further angular misalignment of the inner member relative to the outer ring, and
   wherein the outer ring comprises a radially outward extending first circumferential groove located proximate the outer ring first axial end and extending radially out into a first cylindrical shoulder, the outer ring restraint feature comprising an annular bumper pad having an anchor leg secured in the first circumferential groove and a head portion extending from the anchor leg and extending circumferentially around the bumper pad, the second portion including the head portion.

2. The spherical plain bearing of claim 1, wherein the inner member restraint feature comprises a radially outward extending lip formed on the inner member first axial end.

3. The spherical plain bearing of claim 2, wherein the lip transitions into a concave arcuate valley which blends into the convex exterior surface of the inner member, the first portion including the concave arcuate valley.

4. The spherical plain bearing of claim 3, wherein the concave arcuate valley has a depth of 0.254 mm to 3.81 mm and a width of 0.508 mm to 7.62 mm.

5. The spherical plain bearing of claim 1,
   wherein the inner member restraint feature comprises a radially outward extending lip formed on the inner member first axial end,
   wherein the lip transitions into a concave arcuate valley which blends into the convex exterior surface of the inner member, the first portion including the concave arcuate valley,
   wherein the head portion has a convex arcuate surface that is complementary in shape to the concave arcuate valley,
   wherein the convex arcuate surface has a first radius of curvature R1 and the concave arcuate valley has a second radius of curvature R2, and
   wherein the second radius of curvature R2 is about 100 to 120 percent of the first radius of curvature R1.

6. The spherical plain bearing of claim 5, wherein the second radius of curvature R2 is 102 percent of the first radius of curvature R1.

7. The spherical plain bearing of claim 5, wherein the outer ring comprises a radially outward extending second circumferential groove located proximate the outer ring second axial end and extending radially out into a second cylindrical shoulder, a second outer ring restraint feature comprising an annular bumper pad having an anchor leg secured in the second circumferential groove and a head portion extending from the anchor leg and extending circumferentially around the bumper pad.

8. The spherical plain bearing of claim 1, further comprising a self-lubricating liner disposed between the concave interior spherical surface and the convex exterior spherical surface.

9. The spherical plain bearing of claim 1, wherein the outer ring has at least one fracture split that extends axially from the outer ring first axial end to the outer ring second axial end and radially through the outer ring.

10. The spherical plain bearing of claim 1, wherein the inner member restraint feature is one selected from an arcuate surface and a chamfer.

11. The spherical plain bearing of claim 1, wherein the angular misalignment restraint system is a first angular misalignment restraint system, and the spherical plain bearing comprises a second angular misalignment restraint system including a second inner member restraint feature on the inner member and a second outer ring restraint feature on the outer member,
   wherein the first angular misalignment restrain system is on the outer ring first axial end and the inner member first axial end, and the second angular misalignment restrain system is on the outer ring second axial end and the inner member second axial end,
   wherein a first portion of the second inner member restrain feature is spaced apart from a second portion of the second outer ring restraint feature when the inner member and the outer ring are angularly misaligned relative to one another by less than the predetermined maximum angle $\theta$,
   wherein the first portion of the second inner member restrain feature is shaped and arranged to come into a second abutment with the second portion of the second outer ring restraint feature when the inner member and the outer ring are angularly misaligned relative to one another by the predetermined maximum angle $\theta$, and
   wherein the second abutment prevents any further angular misalignment of the inner member relative to the outer ring.

12. A spherical plain bearing comprising:
   an outer ring having an outer ring first axial end, an outer ring second axial end opposite to the outer ring first axial end, and a concave interior spherical surface extending between the outer ring first axial end and the outer ring second axial end;
   an inner member having an inner member first axial end, an inner member second axial end opposite to the inner member first axial end and a convex exterior spherical surface between the inner member first axial end and the inner member second axial end, the inner member being pivotally disposed at least partially in the outer ring such that the inner member and the outer ring are angularly misalignable relative to one another; and
   an angular misalignment restraint system which includes an inner member restraint feature on the inner member and an outer ring restraint feature on the outer member,
   wherein a first portion of the inner member restrain feature is spaced apart from a second portion of the outer ring restraint feature when the inner member and the outer ring are angularly misaligned relative to one another by less than a predetermined maximum angle $\theta$,
   wherein the first portion of the inner member restrain feature is shaped and arranged to come into abutment with the second portion of the outer ring restraint feature when the inner member and the outer ring are angularly misaligned relative to one another by the predetermined maximum angle $\theta$,
   wherein the abutment prevents any further angular misalignment of the inner member relative to the outer ring,
   wherein the outer ring has at least one fracture split that extends axially from the outer ring first axial end to the outer ring second axial end and radially through the outer ring, and
   wherein the outer ring comprises a radially outward extending second circumferential groove located proximate the second axial outer ring end and an annular seal seated in the second circumferential groove, wherein a portion of the seal sealingly and slidingly engages the convex exterior spherical surface.

13. A spherical plain bearing comprising:
   an outer ring having an outer ring first axial end, an outer ring second axial end opposite to the outer ring first axial end, and a concave interior spherical surface extending between the outer ring first axial end and the outer ring second axial end;
   an inner member having an inner member first axial end, an inner member second axial end opposite to the inner member first axial end and a convex exterior spherical surface between the inner member first axial end and the inner member second axial end, the inner member being pivotally disposed at least partially in the outer ring such that the inner member and the outer ring are angularly misalignable relative to one another; and
   an angular misalignment restraint system which includes an inner member restraint feature on the inner member and an outer ring restraint feature on the outer member,
   wherein a first portion of the inner member restrain feature is spaced apart from a second portion of the outer ring restraint feature when the inner member and the outer ring are angularly misaligned relative to one another by less than a predetermined maximum angle $\theta$,
   wherein the first portion of the inner member restrain feature is shaped and arranged to come into abutment with the second portion of the outer ring restraint feature when the inner member and the outer ring are angularly misaligned relative to one another by the predetermined maximum angle $\theta$, and
   wherein the abutment prevents any further angular misalignment of the inner member relative to the outer ring, and
   wherein the outer member restraint feature is configured in an interference fit with the convex exterior spherical bearing surface of the inner member to function as a seal.

* * * * *